UNITED STATES PATENT OFFICE.

EDWARD ROBERTSON BARROW, OF MEMPHIS, TENNESSEE, ASSIGNOR TO BARROW COTTONSEED PRESERVER COMPANY, OF MEMPHIS, TENNESSEE, A CORPORATION OF TENNESSEE.

PROCESS FOR STERILIZING AND PRESERVING COTTON-SEED.

1,155,194.  Specification of Letters Patent.  Patented Sept. 28, 1915.

No Drawing.  Application filed October 7, 1914.  Serial No. 865,578.

*To all whom it may concern:*

Be it known that I, EDWARD ROBERTSON BARROW, a citizen of the United States, residing at Memphis, in the county of Shelby and State of Tennessee, have invented certain new and useful Improvements in Processes for Sterilizing and Preserving Cotton-Seed, (Case B;) and I do hereby declare the following to be a full, clear, and exact description of the invention, such as will enable others skilled in the art to which it appertains to make and use the same.

My present invention relates to an improved method of treating cotton seed in order to prevent the same from deterioration due to the organic changes incident to heating or sprouting, or both; and it consists in certain improvements over the method shown in my Patent No. 1,119,672, granted December 1, 1914, and entitled "Process for sterilizing and preserving cotton seed."

It is well known that cotton seed varies largely from year to year in the quantity of water contained therein. When it contains excessive moisture, if it is subjected to external heat, or develops heat from germination, it tends to sprout, causing organic changes in the kernel which largely impair the value of the cotton seed as an oil producer, and as an eatable product for animals. This tendency of the seed to heat up and sprout has rendered it necessary hitherto to work up the seed as promptly as practicable in the oil mills, and is largely prohibitive of the shipment of the seed in bulk in sea-going vessels, where the temperature is always more or less high in the cargo space of the vessel.

As stated in my patent aforesaid, I have found that, by treating cotton seed, with the hulls on, with ordinary sodium chlorid, the germinating power of the seed is destroyed and the seed is maintained for long periods in a sound and unimpaired condition, as far as the subsequent manufacture of the seed into cotton seed oil and food products for animals is concerned; but, of course, the seed is sterilized.

I have found that by mixing with the sodium chlorid, as described in my patent aforesaid, a small percentage of starch and magnesium carbonate the efficiency of the salt for the purpose stated is materially enhanced. Sodium chlorid having the property of absorbing moisture from the air, that is being hygroscopic in nature, I have found that the efficiency of my process of preserving and sterilizing is enhanced by having the salt perfectly dry when applying same to the seed, and accomplish this end by the addition of small quantities of magnesium carbonate and dry starch. In this manner the property of the salt to absorb moisture and become hard or caked is overcome by the presence of these added ingredients and the efficiency of my process is increased by having the salt in condition to absorb the maximum amount of moisture from the cotton seed to which it may be applied.

The salt, starch and magnesium carbonate are preferably intimately mixed and then, while in the pulverized dry form, thoroughly stirred into the seed, tending to coat the same with the mixture. The moisture of the seed and the air coming in contact with the sodium chlorid mixture above described will tend to form a preserving medium for the seed which, penetrating through the hulls, will destroy the germinating power of the seed.

In practice, when using the composition in the dry form, I use a composition of about 96% sodium chlorid, about 2% of starch and about 2% of magnesium carbonate, the products to be intimately mixed together and then to be mixed into the cotton seed, but the proportions of these ingredients may be varied at will, provided, however, there is always an excess of salt present.

The minute quantity of salt that passes through the hulls and permeates the kernel will not be sufficient to impair the edibility of the cotton seed meal after the oil has been extracted, but, on the contrary, it would render the cotton seed meal more palatable as stock food; while the salt would not in any way affect the chemical nature of the cotton seed oil and could be readily washed out. This salt might be removed, if desired, but as a matter of fact salt is often added to improve the flavor of the cotton seed oil; and the amount of salt in my process would not be sufficient to injure the palatability of the oil. Moreover, the amount of salt and carbonate of magnesium would not materially impair the use of the cotton seed meal as a fertilizer.

One object of the herein described process of treating the cotton seed is that the composition causes the hull of the seed to swell and draw away from the kernel so that when the seed is dry the hull becomes a loose envelop on the kernel, like the dry pod of a pea, and may be as such more easily separated from the kernel than in the process now in use, where the seed comes from the field, without any preliminary treatment.

The seed mixed with the powdered composition dry may be stored away for an indefinite period.

By the herein described process, the seed is placed in such a condition that it will keep indefinitely, and the operation of milling the same may be carried on through a series of months, or throughout the entire year, if desired; whereas under present conditions the seed must be hurried to the mill and promptly milled, as the milling season lasts only about four months, due to the probable deterioration of the seed if it be kept longer.

It will be obvious that the seed may be treated with the composition at the gin after the staple cotton has been removed therefrom, and either before or after the seed has been delinted; and that the seed may be retained at the gin after such treatment, or may be stored in any convenient warehouse at the mill, or elsewhere.

Having thus described my invention, what I claim and desire to secure by Letters Patent of the United States is:—

1. The herein described process of treating cotton seed to sterilize and preserve the same, which consists in treating the same with small quantities of sodium chlorid, starch and magnesium carbonate, substantially as described.

2. The herein described process of treating cotton seed to sterilize and preserve the same, which consists in treating same with about 5% by weight of sodium chlorid which would contain about 2% by weight of starch and 2% by weight of magnesium carbonate, substantially as described.

3. The process of treating cotton seed to sterilize and preserve the same, which consists in mixing finely divided chlorid of sodium, starch and magnesium carbonate with the cotton seed having the hulls on, substantially as described.

4. The process of treating cotton seed to sterilize and preserve the same, which consists in mixing about 5% by weight of finely divided chlorid of sodium, containing about 2% by weight of starch, and 2% by weight of magnesium carbonate with the cotton seed having the hulls on, substantially as described.

In testimony whereof, I affix my signature, in presence of two witnesses.

EDWARD ROBERTSON BARROW.

Witnesses:
R. P. CARY,
RAYMOND FRANKEY.

Copies of this patent may be obtained for five cents each, by addressing the "Commissioner of Patents, Washington, D. C."